(12) United States Patent
Kubota

(10) Patent No.: US 8,618,004 B2
(45) Date of Patent: Dec. 31, 2013

(54) MULTIFUNCTIONAL COMPOSITES

(76) Inventor: Masanori Kubota, Hockessin, DE (US)

(*) Notice: Subject to any disclaimer, the term of this patent is extended or adjusted under 35 U.S.C. 154(b) by 1750 days.

(21) Appl. No.: 11/724,110

(22) Filed: Mar. 14, 2007

(65) Prior Publication Data
US 2007/0293108 A1    Dec. 20, 2007

Related U.S. Application Data

(60) Provisional application No. 60/783,210, filed on Mar. 16, 2006, provisional application No. 60/793,237, filed on Apr. 19, 2006, provisional application No. 60/813,912, filed on Jun. 15, 2006.

(51) Int. Cl.
*B32B 27/04* (2006.01)

(52) U.S. Cl.
USPC .......... 442/133; 428/295.1; 428/364

(58) Field of Classification Search
USPC ......... 442/131, 132, 133, 134, 136, 226, 227, 442/260, 261, 263, 265, 266, 267, 277, 442/283–294; 428/295.1, 297.1, 299.1, 428/299.4, 299.7, 364, 365, 911, 913
See application file for complete search history.

(56) References Cited

U.S. PATENT DOCUMENTS

| | | | |
|---|---|---|---|
| 4,408,004 A | 10/1983 | Pengilly | |
| 4,661,559 A * | 4/1987 | Gardner et al. | 525/65 |
| 4,859,524 A | 8/1989 | Kim et al. | |
| 4,879,165 A | 11/1989 | Smith | |
| 5,254,626 A | 10/1993 | Penco et al. | |
| 5,360,671 A | 11/1994 | Harris | |
| 5,567,529 A | 10/1996 | Smith | |
| 5,626,703 A | 5/1997 | Tomita et al. | |
| 5,700,560 A | 12/1997 | Kotani et al. | |
| 5,893,959 A | 4/1999 | Muelilch | |
| 6,926,853 B2 | 8/2005 | Hinc et al. | |
| 6,991,124 B1 | 1/2006 | Palley et al. | |
| 7,087,296 B2 | 8/2006 | Porter | |
| 7,148,162 B2 | 12/2006 | Park et al. | |
| 2005/0095415 A1 * | 5/2005 | Raghavendran | 428/292.1 |

OTHER PUBLICATIONS

Gama, et al. Low Velocity Impact and Damage Behavior of Kevlar Bonded Carbon/Epoxy Composites Fabricated by Near-IR Irradiation; Composites 2006 Convention and Trade.
Show American Composites Manufacturers Association Oct. 18-20, 2006; St. Louis MO; pp. 1-7.

* cited by examiner

*Primary Examiner* — Arti Singh-Pandey
(74) *Attorney, Agent, or Firm* — McCarter & English (57) ABSTRACT

A composite structure comprising a high tenacity fiber coated by a matrix resin is provided. The matrix resin has elongation at break of at least about 100% and tensile strength at break of less than about 50 Mpa. The composite structure can further comprise an impact-absorbing elastomeric filler integrated into the matrix resin. Also provided is a method for making a composite structure. The method includes providing a high tenacity fiber; providing a matrix resin with elongation at break of at least about 100% and tensile strength at break of less than about 50 Mpa; and coating the high tenacity fiber with the matrix resin. The method can further comprise adding an impact-absorbing elastomeric filler into the matrix resin.

16 Claims, 3 Drawing Sheets

FIG. 7

MULTIFUNCTIONAL COMPOSITES

CROSS REFERENCE TO RELATED APPLICATIONS

The present application claims the benefit of U.S. Provisional Application Ser. No. 60/783,210, filed Mar. 16, 2006, Ser. No. 60/793,237, filed Apr. 19, 2006, Ser. No. 60/813,912, filed Jun. 15, 2006, and U.S. Utility application Ser. No. 11/214,306 filed Aug. 29, 2005 and now abandoned, Ser. No. 11/233,274 filed Sep. 22, 2005 and now abandoned, the disclosures of which are expressly incorporated herein by reference in their entireties.

FIELD OF THE INVENTION

The field of the invention generally relates to multifunctional composite materials. More specifically, the field of impact resistant multifunctional composite materials.

BACKGROUND OF THE INVENTION

Manufacturers, such as automobile and aircraft manufacturers desire the advantages that fiber reinforced polymeric composites provide, such as rigidity, high tensile strength, and relatively low weight. Conventional composites, however, exhibit an unacceptable disadvantage in that they easily shatter on impact. Damaged composite material is not easily repaired and usually the damaged area must be replaced with a new composite part.

Impact resistance of composites is a major concern in the industry and this concern has limited the use of composites in many applications including exterior panels exposed to impact or undercarriage panels exposed to damage from roadway or runway debris. Accordingly, there is a need for a composite structure that has the high strength and lightweight performance characteristics of conventional composites, combined with high resistance to impact damage.

SUMMARY OF THE INVENTION

A composite structure comprising a high tenacity fiber coated by a matrix resin is provided. The matrix resin has elongation at break of at least about 100% and tensile strength at break of less than about 50 Mpa. The composite structure can further comprise an impact-absorbing elastomeric filler integrated into the matrix resin. Also provided is a method for making a composite structure. The method includes providing a high tenacity fiber; providing a matrix resin with elongation at break of at least about 100% and tensile strength at break of less than about 50 Mpa; and coating the high tenacity fiber with the matrix resin. The method can further comprise adding an impact-absorbing elastomeric filler into the matrix resin.

DETAILED DESCRIPTION OF THE INVENTION

Multi-layered composites are provided which are resistant to spalling, cutting, impact, and shearout forces, while providing strength and rigidity. The composite materials of this invention can be used for automobile and aircraft body panels, highway and road signs, equipment housing compartments, aircraft components, boat hulls, security barriers, architectural panels, building materials, transport and cargo containers, fuel tanks, compressed gas tanks, hazardous material containers, military structures and equipment, and housings for a variety of consumer and industrial products where impact resistance and container strength are desired. As used herein, the following terms are defined:

"Composite" means any combination of two or more materials (such as reinforcing elements, fillers, etc., and a composite matrix binder) differing in form or composition on a macro scale. The constituents retain their identities: that is, they do not dissolve or merge completely into one another although they act in concert. Normally, the components can be physically identified and interface between one another.

"Fabric" means a cloth which can be, for example, nonwoven, needled, woven, knit, or braided fibrous material, such as yarn, tow, roving, or individual fibers.

"Tensile Modulus" (also Young's modulus)—means the ratio of normal stress to corresponding strain for tensile or compressive stresses less than the proportional limit of the material.

"Tensile Strength" means the maximum load or force per unit cross-sectional area, within the gauge length, of a specimen. The pulling stress required to break a given specimen. (See, for example, ASTM D579 and D3039, which are hereby incorporated by reference). The tensile strength is also used synonymously with "tenacity" herein.

"Tensile Strength At Break" means tensile strength recorded at the moment of rupture of the specimen.

"Elongation" means deformation caused by stretching. The fractional increase in length of a material stressed and tensioned (when expressed as a percentage of the original gauge length, it is called percentage elongation.)

"Elongation At Break" means elongation recorded at the moment of rupture of the specimen, often expressed as a percentage of the original length.

"Toughness"—means the amount of work required to cause failure, expressed as the area under the stress-strain curve of a test material. The absence of brittleness.

The term "fiber" as used herein refers to a fundamental component used in the assembly of yarns and fabrics. Generally, a fiber is a component which has a length dimension which is much greater than its diameter or width. This term includes ribbon, strip, staple, and other forms of chopped, cut or discontinuous fiber and the like having a regular or irregular cross section. "Fiber" also includes a plurality of any one of the above or a combination of the above.

As used herein, the term "high performance fiber" means that class of synthetic or natural non-glass fibers having high values of tenacity greater than 10 g/denier, such that they lend themselves for applications where high abrasion and/or cut resistance is important. Typically, high performance fibers have a very high degree of molecular orientation and crystallinity in the final fiber structure.

Figure 1:
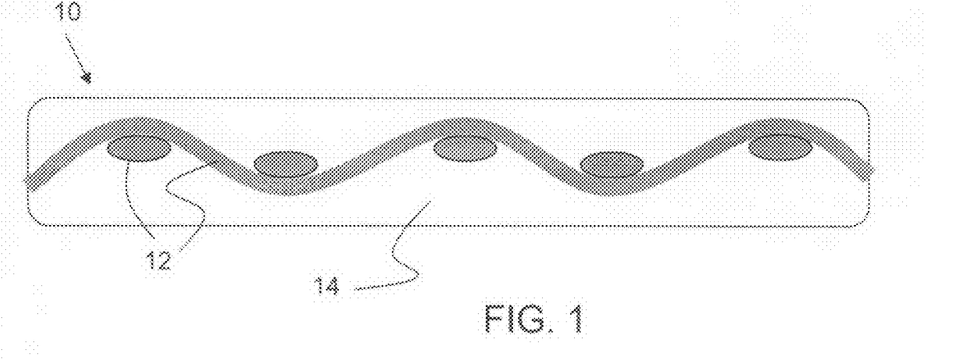
FIG. 1 is a schematic representation of a composite structure in accordance with one embodiment of the invention.

The composite structures, shown schematically in FIG. 1, include a high tenacity fiber 12 coated by a matrix resin 14. The composites provide unique impact-resistant characteristics because the matrix resin used to coat the high tenacity fibers have a high percent elongation. For example, the matrix resins have elongation at break values of at least about 100%. In one embodiment, the composite structure includes a matrix resin that has elongation at break between about 100% and 1800%, and in another embodiment the matrix resin has elongation at break between about 150% and 800%. The high tensile elongation at break percent (100% to 1800%) of the matrix resin provides the composite layer with high flexibility.

In addition to high elongation at break values, the matrix resins also display low tensile strength at break. For example, the matrix resins have tensile strength at break of less than about 50 Mpa. In one embodiment, the matrix resins have tensile strength at break of less than about 25 Mpa, and in another embodiment, matrix resins have tensile strength at break of less than about 10 Mpa. The relatively low tensile strength at break characteristic of the matrix resin imparts impact resistance to the composite such that the composite layer resists shattering or breaking when struck by an impact force.

A matrix resin 14 for use in these composites is selected by the appropriateness of its mechanical properties. Polyamide resins have a broad range of values for tensile strength at break, for example, 30 to 200 MPa and a range of tensile elongation at break of 2% to 400%. The range of values selected for the polyamide resin for use in the composites according to the invention is less than 50 Mpa and greater than 100% elongation at break. One example of a polyamide resin that meets this criteria is Polyamide AQP-95 available from Toray Fine Chemical that has a tensile strength at break of 28 MPa and a elongation at break of 510%.

The thermoplastic matrix resin 14 used to form the composite 10 can be selected from a variety of polymers. Exemplary polymers include thermoplastic polymers such as polyethylene, polypropylene, polyacrylate, an ionomer, polyamide, polyester, or thermoplastic polyurethane. In some embodiments, the polymer may be a thermoplastic polyimide.

The matrix resin concentration can be from 10% to 99% by weight in the composite. Preferably, the matrix resin content is greater than 50% and up to 90% by weight in the composite. Not to be limited to any particular theory, it is currently believed that the high percent elongation of the matrix resin and relatively high matrix resin content of the composite contributes to the impact absorption and impact resistance of the overall composite structure, as the matrix resin absorbs impact energy and translates the energy onto the high tenacity fibers, where the energy can be absorbed by the stretching of the fibers.

Figure 2:
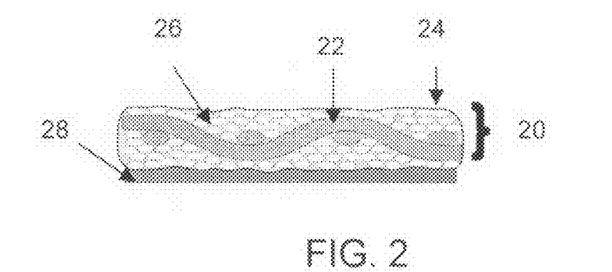
FIG. 2 is a schematic representation of a composite structure in accordance with another embodiment of the invention.

To impart further impact-resistant functionality on the composite, an impact-absorbing filler 26 can be integrated into the matrix resin 24, as shown in FIG. 2. The impact-absorbing filler 26 is dispersed in the matrix resin 24 that coats the high tenacity fibers 22.

The impact absorbing filler is added to the matrix resin layer to provide a high degree of elasticity and flexibility to the composite structure. The function of the filler is to absorb impact force from an external source and redistribute the impact force laterally, perpendicular or at a 360° direction to the direction of the applied force. The filler can be an elastomeric material, such as thermoplastic elastomers (TPE), rubber elastomers (including EPDM), silicone elastomers, fluoroelastomers and fluorosilicone elastomers. The elastomer filler is typically in the form of a powder with an average particle size of less than about 100 microns. The elastomer filler powder is uniformly dispersed into the matrix resin by using commonly known mechanical dispersion procedures. The elastomer filler comprises about 20% to about 80% by weight of the matrix resin. The preferred percent by weight of filler in the resin is about 50%. In manufacturing the composite, the matrix resin containing the filler is coated onto the high tenacity fiber and dried to form the composite layer 20.

The addition of the filler to the matrix resin is especially useful when the composite structure is applied to a substrate to provide impact-resistance on the surface of the substrate that is vulnerable to impact, i.e. the front of the substrate exposed to collisions and impacts. The composite structure formed without the filler also provides impact and shatter resistance, and is particularly useful when applied to the back side of the substrate to prevent penetration of the substrate from a projectile.

The high tenacity fiber 12, 22 is a reinforcing fiber, such as carbon, aramid or glass fiber, high tenacity polyethylene fibers, liquid crystalline polymers, and others. On example of an appropriate fiber is sold under the name VECTRON 1200 by Celanese Corporation, an is a liquid crystalline aromatic polyester. Another appropriate fiber is sold under the name KEVLAR by Dupont Co. The fiber geometry with the composite can be unidirectional in a prepreg configuration, or they can be woven in a two-dimensional configuration. The fiber can be in the form of a fabric. The high tenacity fiber forms the core material that imparts high performance mechanical properties into the composite. The high tenacity fiber has tensile strength of greater than about 10 g/denier, and preferably greater than about 12 g/denier.

The composite structures as described provide impact resistant functionality, and can be used in conjunction with other composites or substrates to impart the impact-resistant functionality. The composite structures can be attached to substrates using traditional methods of adhesion, such as by using an adhesive placed between the composite structure surface and the substrate surface. An epoxy based adhesive or other compatible type adhesive can be placed between the composite structure and the substrate surface. The surfaces are held together under pressure until the adhesive has reacted and dried. The adhesive setting time can be accelerated by applying heat in an oven or autoclave per the adhesive supplier instructions. Another method of bonding the composite structure and substrate is to apply the composite structure onto the substrate surface and hold the surfaces together under pressure while heating to the melting point of the thermoplastic resin in the composite. Heating can be done in an oven or autoclave. Note that in both cases described, applying heat to the composite structure may have a detrimental effect upon the high tenacity fiber used in the composite.

In addition to the traditional methods of adhesion, a method employing pseudo-transmission infrared radiation (PTIR) to adhere the composite to a substrate can be used. This method, which avoids damaging the integrity of the core materials and matrix resin through heat exposure, is described in U.S. Utility application Ser. No. 11/214,306 filed Aug. 29, 2005 and Ser. No. 11/233,274 filed Sep. 22, 2005, the disclosures of which are expressly incorporated herein by reference in their entireties.

When forming multi-component structures based on the composite described, the high tenacity fiber coated by the matrix resin forms a first composite layer, and the structure can include an infrared absorber polymer layer coated on the first composite layer. This infrared absorber polymer layer is useful when the PTIR method of adhesion is used to adhere multiple components together. This additional layer 28 in the structure is shown in FIG. 2. This absorber layer is a thermoplastic polymer layer containing a near-infrared radiation absorber dispersed within the polymer. Layer 28 is placed on the surface of the composite layer 20. The absorber layer can be coated or extruded onto the surface of the composite layer. The process of assembly the radiation absorber layer onto the composite layer of this prepreg layer structure is described in U.S. application No. 60/783,210, filed Mar. 16, 2006, the contents of which are fully incorporated herein by reference.

The absorber layer has partial absorption characteristics optimized by uniformly dispersing an infrared absorbing material throughout the polymer layer. The infrared absorber can be dispersed into the polymer using dispersion techniques known to the industry. Polymer materials used as a matrix in preparing the absorber layer can include thermoplastics, including polyolefin, ionomer, polyamide, polyester, polyacrylate, polycarbonate, polystyrene, polyurethane and polyvinyl chloride. Engineering thermoplastics such as polyimide, polyamideimide, polyketone and polyetheretherketone can also be used. Other types of polymers that can be used include fluoropolymers and thermoelastomers including thermoelastomer olefins and thermoelastomer vulcanizates.

Thermoset plastics such as polyimide and epoxy resin, phenolic resin, urea resin, melamine resin, unsaturated polyester resin, polyurethane are also useful as polymer matrices for the absorber layer. A preferred thermoset polyimide is SKYBOND 700, made by Industrial Summit Technology Company, 500 Cheesequake Road, Parlin, N.J. 08859. Another preferred material is 2214 epoxy resin, available from 3M Company of St. Paul, Minn.

The absorber layer polymer can be formed as a discrete partial absorber layer by cast coating or extruding the polymer with absorber into a film. The absorber-polymer can be formed into an absorber layer by using two-color molding or co-extrusion. The polymer can be extruded into other forms such as tubing or other components.

A near-IR absorber can be used to sensitize the polymer to partially absorb radiation. The absorber is sensitive to absorbing radiation in the wavelength range between 700 nm and 2,000 nm. The near-IR absorber can be dispersed into the polymer or applied to the surfaces of the polymer that is being formed or joined in the process. The near-IR absorber is dispersed or coated at a concentration to partially absorb and partially transmit near-IR radiation. The resulting pseudo-transmission infrared radiation (PTIR) method achieves controlled forming or joining of polymeric parts. Various suitable apparatuses and methods of irradiating a surface or part using a radiant energy source are disclosed in U.S. Pat. No. 6,369,845 and U.S. Pat. No. 6,816,182 which are both incorporated herein by reference for their teachings in the art of irradiation of a surface using a radiant energy source. The deep focal penetration radiation source described in U.S. Pat. No. 6,816,182 is ideal for use as a radiation source for the PTIR application.

The optimum concentration of the absorber dispersed within the polymer layer is dependent on the thickness of the polymer layer, the absorption of the polymer and the absorption of the near-IR absorber. The objective is to project IR radiation throughout the PTIR polymer layer and have the radiation absorbed throughout the polymer layer to rapidly heat the polymer layer so that the polymer melts. The melted PTIR layer conducts heat to the interface and melts the interface at the surface of adjacent polymer layers while pressure is applied. The pseudo-transmission process can work in the range of 1% to 99% transmission for the pseudo-transmission layer. The optimum absorption value for near-IR radiation is about 75% for the combined absorption of the polymer and the absorber added to the polymer in the pseudo-transmission layer.

The percentage by weight (concentration) of absorber dispersed in the polymer will depend on the type of absorber and absorption efficiency (absorption coefficient) of the absorber. The known relationship for calculating the absorption based on the concentration of absorber dispersed into the polymer and the PTIR layer thickness is:

$$\text{Absorption}(\%) = \log(1/T) = A1B1 + A2B1C2$$

A=absorption coefficient, B=thickness of layer, C=concentration absorber,
1=polymer, 2=IR absorber The polymer itself can absorb some IR in the 700 nm to 2,000 nm range. The % A is measured across the wavelength output range for the near-IR radiation source.

The PTIR layer with the optimum partial absorption characteristics can be made by uniformly dispersing an infrared absorbing material throughout the PTIR polymer layer. Infrared absorbing materials that can be dispersed include carbon black, graphite, charcoal, talc, glass filler, ceramics, metal oxides, phthalocyanine pigment, and other infrared absorbing organic or inorganic pigments or dyes known in the art. Metal powders, such as stainless steel, brass, aluminum, copper and others can also be dispersed in the polymer matrix as infrared absorbers. The IR absorber can be dispersed into the polymer using ball milling or other dispersion techniques known to the industry.

The concentration of infrared absorber dispersed in the polymer layer can be at a concentration that absorbs sufficient radiation to melt or soften the polymer so that it bonds to adjacent polymer parts. The concentration is set so that the layer is somewhat transparent to infrared radiation. Optimally, sufficient radiation is absorbed in the layer to melt or soften it and thus bond the polymer to the part at the top surface of the interface (i.e., the part nearer the infrared source), while at the same time enough radiation should penetrate into and through the layer to a sufficient depth to melt or soften the bottom of the layer to bond it to the polymer on the bottom surface of the interface (i.e., side farther away from the infrared source). The polymer layer should also melt or soften sufficiently to flow into the gaps at the surface interface, optionally with the aid of pressure.

One advantage of using the PTIR process for consolidation of the functional and substrate layers is that the high tenacity fibers in the composite layers are not adversely heated or degraded by the radiation process. High tenacity organic fibers such as KEVLAR and VECTRAN LCP are known to degrade in tenacity and loose significant strength when heated above 250 C during processing. These fibers cannot be processed in an autoclave for more than a short period of time. As an example, Celanese VECTRAN high tenacity fiber will degrade in the autoclave heating at 250 C at a processing time of more than 1 hour, according to the vendor technical literature.

In another example of the use of this invention in the manufacture of the multifunctional composite, the pseudo-transmission polymer layer containing the near-infrared absorber can be applied as a solution (or dispersion) to the first composite substrate surface. In this procedure, the first substrate surface is prepared for bonding by sand blasting and using an acid wash on the surface. The pseudo-transmission polymer material containing the dispersed near-infrared absorber is applied as a solution or liquid dispersion onto the substrate surface and dried onto the surface. During this step, the pseudo-transmission polymer forms a film on the substrate surface that acts as a primer to improve intimate bonding of the functional layer. The pseudo-transmission polymer dispersion is made from the same polymer and is identical to the resin matrix used to coat the high tenacity fibers in manufacturing the functional composite layer. The pseudo-transmission polymer dispersion dries onto the substrate surface where it bonds to the surface forming a extremely strong bond to the surface.

The functional composite layer is placed on top of the substrate layer that has the primer coating of the pseudo-transmission polymer dispersion. Near-infrared radiation is projected through the functional composite layer onto the pseudo-transmission layer and is absorbed to heat the PTIR layer and intimately join the first substrate and second functional layers, forming a strong bond. This very strong bond of the two composites at the interface, along with the high elongation at break functional polymer properties and the high tenacity fiber functional composite properties combine to provide excellent impact resistance to the multi-component and multifunctional composite.

Figure 3:
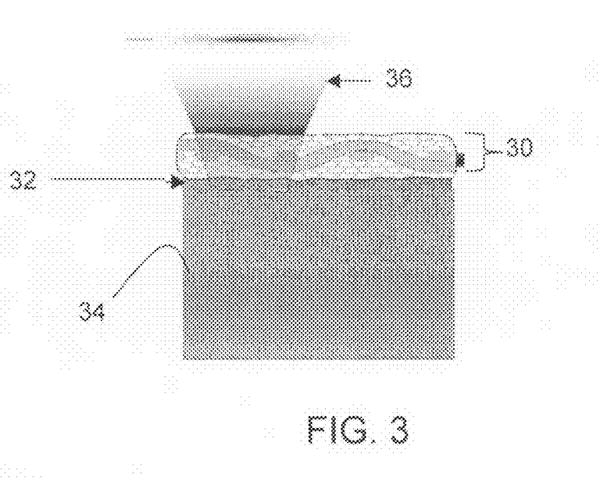
FIG. 3 is a schematic representation of a composite structure being joined to a substrate in accordance with an embodiment of the invention.

A multifunctional composite can be assembled by applying the composite structure, as shown in FIGS. 1 and 2, to substrates, including other composite materials such as thermoplastic or thermoset composites used broadly within the industry. Application of the composite structure by irradiation welding to the surface of another composite structure will incorporate high impact resistance into the welded structure. An example of this process is shown in FIG. 3. The composite structure 30, similar to that shown in FIG. 2, is joined to the surface of a substrate 34 by irradiation welding using a near-IR radiation welding source to apply radiation 36 to the absorber layer 32 at the composite-substrate interface. The radiation is absorbed and melts the absorber layer 32 to bond the composite structure and the substrate together.

The composite structure can be applied to a substrate to form a multi-functional composite by any appropriate means, including by radiation-welding as described.

Figure 4:
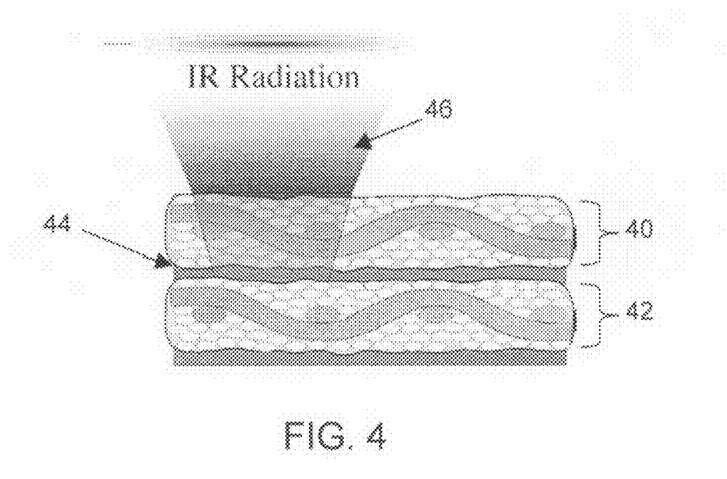
FIG. 4 is a schematic representation of a multilayer composite structure being formed in accordance with another embodiment of the invention.

An impact resistant composite structure can be used as a single layer composite material joined to a substrate, or it can be joined into multiple layers to increase the impact resistance and structural strength. An example of joining a multilayer structure is shown in FIG. 4. FIG. 4 shows the structure being formed by a radiation process, but any method of adhesion is encompassed by the invention. When joining multiple layers by irradiation, the radiation is used to partially irradiate the radiation absorber layer 44 to melt the layer and join together the composite structure 40 with the composite structure 42. The composite structures 40 and 42 are held together under pressure and irradiated by a radiation source 46 causing the layer 44 to melt and bond the multilayer structure forming a multifunctional composite structure that has both high strength and rigidity and at the same time high impact and shatter resistance.

Figure 5:
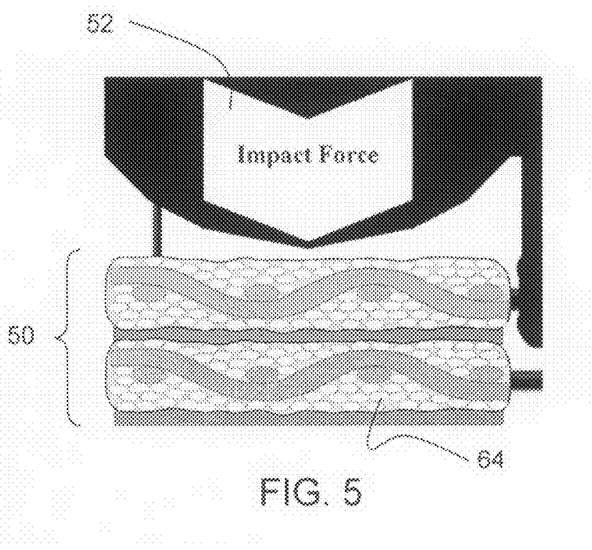
FIG. 5 is a schematic representation of a multilayer composite structure in accordance with an embodiment of the invention.

Referring to FIG. 5, the composite structure 50 has a high impact resistance when struck by a impact force 52 on the surface. Normally, a high impact force striking the composite could cause fracture, shatter, or cracking of the composite surface and the internal structure of the composite below the surface. In this invention, the multiple layer composite is made using a resin matrix that has high elongation so that the composite layers of the structure 50 are flexible and can absorb the impact. Additionally, the elastomer filler in the matrix resin layers absorbs the impact force or energy and translates the energy laterally to disperse the force across a wide area of the composite surface. This provides high impact, shatter, and spall resistance in the composite structure.

Figure 6:
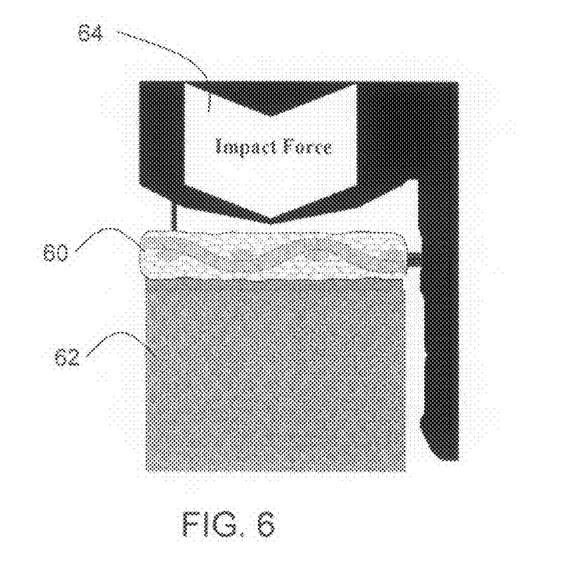
FIG. 6 is a schematic representation of a composite structure on a substrate in accordance with an embodiment of the invention.

The same impact, shatter, and spall resistance can be imparted to a substrate when the composite structure 60, as shown in FIG. 6, or a multilayer composite structure is adhered to a substrate 62. If the substrate 62 is a rigid composite susceptible to breakage or shatter on impact, the composite structure 60 can protect the substrate from impact damage while preserving the strength and rigidity properties of the substrate. As shown in FIG. 6, a composite structure 60 containing an impact absorbing filler is applied to the front surface of the substrate 62. The front surface is the surface that suffers the impact force 64.

Figure 7:
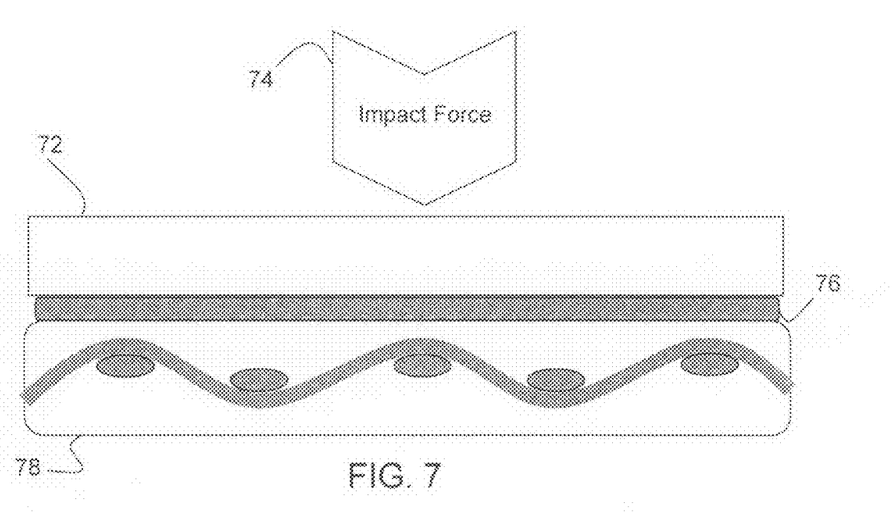

In FIG. 7, the composite structure of FIG. 1 is shown adhered, through an adhesion layer 76, to the back side of the substrate 72. The composite structure 78 does not include an impact absorbing filler, yet provides protection from penetration through the substrate 72 when an impact 74 occurs on the front of the substrate. This type of protection on the back side of a substrate is particularly useful in preventing penetration of a container. For example, the interior of an aircraft fuselage can be coated with the composite structure to prevent penetration from an impact from debris or a ballistic projectile. Similarly, the radar dome on aircraft contain sensitive equipment that is highly critical to operation and safety. The equipment can be damaged if the radar dome is penetrated by ice or debris. The interior of the dome can be coated with a composite structure to prevent penetration through the dome upon impact or damage.

The substrate material can be metal, ceramic, composite, polymer, glass, fabric, concrete and other construction materials. The composite can be made from thermoplastic or thermoset resin and reinforced by carbon, aramid, organic polymer fiber, natural fiber, inorganic fiber or glass fiber where the afore mentioned fibers can be in the form of TOW, prepreg ribbon, tape or fabric. Other substrate materials include thermoplastic or thermoset polymers, basalt and other inorganic based materials.

In one embodiment the substrate is a fiber reinforced composite structure that is formulated to have the functional properties of high strength, high rigidity and toughness. Such a composite substrate can be manufactured using a high tenacity fiber such as carbon, aramid or glass fiber. The fiber used can have a low elongation at break percent value typically between 1% and 5%. This value is also known as the tensile elongation. The reinforcement fiber is coated with a matrix resin that can be a thermoset or thermoplastic resin to manufacture the composite substrate. Thermoset resins are broadly used in industry to make high strength composites. Examples include epoxy thermoset resins, vinylester, polyester-imides, polyamide-imides, polyester-imide/polyamide-imides, polyamides, and phenoxy or polyester-urethane polymers. The matrix resin used to form the composite has a low tensile elongation of typically 1% to 5%. The combination of low tensile elongation resin matrix and reinforced fiber produces a base composite substrate that is high strength, high rigidity and tough. Industrial applications for such composites include aerospace and aircraft manufacture and other applications requiring the described engineering functions. Composite designed in this manner are stiff, inflexible, and may shatter, splinter, and break when exposed to an impact force.

The multifunctional composite structures have broad commercial applications in the areas of automotive, transportation, and aircraft manufacture providing high strength, low weight, and impact resistant composite materials. Other appropriate applications include transportation and cargo carriers, aerospace and aeronautical applications, automotive components, marine hulls, sporting goods, construction materials, tunnel seal liners, bridge column facing, shelters.

Also provided is a method for making a composite structure. The method includes providing a high tenacity fiber, and providing a matrix resin with elongation at break of at least about 100% and tensile strength at break of less than about 50 Mpa. The method then includes coating the high tenacity fiber with the matrix resin. In one embodiment, the method includes putting an impact-absorbing elastomeric filler into the matrix resin.

The coating of the high tenacity fiber with the matrix resin can form a first composite layer, and the method can include coating the first composite layer with an infrared absorber polymer layer. As described above, the layers can be adhered by irradiating the infrared absorber polymer thereby adhering the first composite layer to a substrate or to a second composite layer adjacent to the infrared absorber polymer layer.

Composite components can be made by first preparing a prepreg ribbon or tape by combining a polymer resin matrix with a high tenacity reinforcement fiber. The polymer resin matrix can be a thermoset or thermoplastic resin. The high tenacity fibers used in making composites include carbon, glass fiber, polyaramid fiber, high tenacity polyethylene fibers and others. The prepreg reinforced polymer composite material can used in a tow placement process to position the composite material onto a tooling in the shape of the part to be manufactured. The composite component is constructed by winding layers of prepreg composite material onto the tooling. After winding, the component is placed into an autoclave and heated under pressure to consolidate the component.

The heating process can be done in ramped stages to gradually heat the prepreg layers by conduction heating. During the conduction heating process, the thermoset resin chemically reacts to bond the individual prepreg materials to form a continuous solid composite in the form of the final component. During consolidation, the prepreg material bond together, eliminating any physical gaps within the prepreg material expelling trapped air or gas. If the prepreg is made using a thermoplastic resin instead of a thermoset resin, the autoclave heating and pressure process heats the resin by conduction to the glass transition temperature of the resin where it consolidates by melt flow to eliminate physical spaces and trapped gas from the solid composite component.

Some composite manufacturing processes have features that present a variety of challenges. For example, when automated tow placement (ATP) is used to form composite components, the prepreg is robotically managed and continuously fed onto a tool or part surface to lay-up the composite material component. Multiple layers of prepreg can be bonded into a component shape by the application of heat and pressure. However, some core fiber materials have limited heat and radiation tolerance, restricting their use in composite manufacturing. Also, difficulties arise in achieving bonding quality using prepregs manufactured using low-flow and low-volume resin matrix materials. During lay-up, a low volume resin prepreg may fail to bond adequately to adjacent prepreg on the component form. This can result in forming a low quality component or in component failure. In the heat treatment process done to cure the laid-up composite component in the autoclave, heat is applied to the component from the outside surface. Curing the prepreg lay-up relies on thermal conductivity of the heat to eventually spread throughout the complicated composite structure. U.S. Pat. No. 5,360,671 teaches that the conduction heating process in the autoclave can take seven hours or longer. Very sophisticated temperature control is required to achieve uniform results using the current methods.

Although illustrated and described herein with reference to certain specific embodiments, the present invention is nevertheless not intended to be limited to the details shown. Specifically, a layer such as the functional layer hereinabove described may also be used in numerous other instances to protect an underlayer, such as, for example, when used to connect or weld separate pieces using a heat activated adhesive. Various other modifications may be made in the details within the scope and range of equivalents of the claims without departing from the spirit of the invention.

EXAMPLES

Example 1

The base composite substrate referenced in this document is a reinforced composite that is formulated to have high strength and toughness in application. A commercial example of the composite substrate is a prepreg tape, IM7/8551-7 manufactured by Hexcel Corporation. This composite prepreg is used broadly in aerospace aircraft manufacturing to make composite parts that are very high strength and tough. This prepreg is made using HEXPLY 8551-7 epoxy matrix resin. The elongation at break % (tensile elongation) of fully cured HEXPLY 8551-7 is between 1.40% and 1.64% at 25° C. according to the Hexcel technical datasheet. The carbon fiber reinforcement used to make the prepreg is MAGNAMITE IM7 that has a tensile elongation of 2%. This combination of a low tensile elongation resin matrix and a low tensile elongation fiber is used to fabricate composite parts with high substrate stiffness to produce rigid structural parts and panels.

A baseline carbon/epoxy composite laminate was fabricated using 24-ply M30/8551 prepreg in quasi-isotropic stacking sequence. The laminate was cured in the autoclave at 85 psi external pressure with a heating cycle of 250° F. for 1 hr and at 350° F. for 2 hrs (manufacturer recommended cycle). Specimens of approximate dimensions, 3-in×3-in were cut from the laminate using a wet-saw. The base composite substrate thickness was 3.45 mm (0.136-in) and is referred to as M30/8551 carbon/epoxy prepreg in the subsequent testing. The surface of the base composite substrate was prepared by sandblasting and acid treatment, using a standard procedure for composite surface preparation for adhesion bonding.

Example 2

This example shows the fabrication of the functional composite layer and polymer layer with near-infrared absorber. The functional layer referenced in this document is a reinforced composite that is formulated using a high strength reinforced fiber such as carbon, aramid or glass and a matrix resin with a high value for tensile elongation. The tensile elongation value for the resin should be a power of 2× greater than the substrate resin. The tensile elongation value is a typically 100% to 1800% for the functional layer matrix resin and the PTIR resin layer, but not limited to this value range. Examples of resin matrix systems that can be used for the functional layer are Master Bond Polymer System EP37-3FLF Epoxy resin from Master Bond that has a tensile elongation of 180% and VYLONAL MD-1335 polyester resin from Toyobo that has a tensile elongation of 1200%.

The functional layer prepared in Example 2 was made using KEVLAR 129 plain weave 200 g/m2 coated with a TPU dispersion, Thermoplastic Urethane UA310. The KEVLAR/TPU coating was air dried. The KEVLAR/TPU bonded specimen thickness was 3.86 mm (0.152-in).

A PTIR polymer dispersion was made by adding 1% carbon black to a Thermoplastic Urethane UA310 dispersion. The M30/8551 carbon/epoxy prepreg prepped surface described in Example 1 was coated with the PTIR polymer dispersion and dried to form a primer treated surface with near-infrared absorber properties for joining the functional layer.

The KEVLAR/TPU functional layer was consolidated onto the surface of the M30/8551 carbon/epoxy prepreg. This was done by placing the functional layer under pressure onto the surface of the M30/8551 carbon/epoxy prepreg with PTIR primer coating and irradiating the PTIR interface using a P-WAVE 300H Hyper radiation unit. A strong bond was formed.

Experiment 3

A second functional layer was made using KEVLAR 129 plain weave 200 g/m2 coated with an ionomer polymer dispersion of sodium type Himilan 1707 Ionomer and air dried. The KEVLAR/Ionomer bonded specimen thickness was 3.89 mm (0.153-in).

A PTIR polymer dispersion was made by adding 1% carbon black to a sodium type Himilan 1707 Ionomer dispersion. The M30/8551 carbon/epoxy prepreg prepped surface described in Example 1 was coated with the PTIR polymer dispersion and dried to form a primer treated surface with near-infrared absorber properties for joining the functional layer.

The KEVLAR/Ionomer functional layer was consolidated onto the surface of the M30/8551 carbon/epoxy prepreg. This was done by placing the functional layer under pressure onto the surface of the M30/8551 carbon/epoxy prepreg with PTIR primer coating and irradiating the PTIR interface using a P-WAVE 300H Hyper radiation unit. A strong bond was formed.

Experiment 4

A third functional layer was made using KEVLAR 129 plain weave 200 g/m2 coated with a epoxy polymer HYSOL EA9321. The epoxy bonded specimen thickness was 4.48 mm (0.176-in). The KEVLAR/epoxy functional layer was applied to the surface of the M30/8551 carbon/epoxy prepreg and heat dried in an autoclave.

Experiment 5

Low velocity impact tests were done on the M30/8551 substrate (Baseline), the KEVLAR/TPU bonded sample labeled IMPACGARD U/K, KEVLAR/Ionomer sample labeled IMPACGARD I/K and the KEVLAR/epoxy sample labeled Epoxy Bonded. The impact test results are shown in Table I.

Impact Test Results

Quasi-static punch shear tests and low velocity impact tests were conducted on M30/8551 carbon/epoxy Baseline laminates, TPU bonded KEVLAR/M30/8551, Ionomer bonded KEVLAR/M30/8551, and Epoxy bonded KEVLAR/M30/8551 composite specimens. The impact force was exerted on the surface of the laminates opposite the composite surface, such that the impact occurred on the front side of the laminate, and the composite was adhered to the back side of the laminate. Impact experiments show that, the Baseline composite specimens catastrophically fail in the rear face of impact, while the TPU, ionomer, and epoxy bonded Kevlar specimens contain the back/rear face fracture inside the Kevlar skin. Complete perforation of the baseline specimens are found to occur at 60 J impact energy, and the absorbed energy at complete perforation was found to be approximately 60 J. The TPU bonded specimens were found to perforate at both 80 J and 93 J impact energies, and the average perforation energy is found to be 77.1 J, which is 29% higher than the baseline. The Ionomer bonded specimens are found to perforate at 93 J impact energy and the energy absorbed at perforation is found to be 83.5 J, which is 39% higher than baseline. The Epoxy bonded specimens are found to perforate at 60 J impact energy and the perforation energy is found to be 56.48 J, which is 6% less than the baseline. The poor performance of Epoxy bonded specimens is attributed to excessive wetting of the Kevlar fabric in comparison to TPU and Ionomer bonded specimens. Ionomer specimens showed debonding between the KEVLAR layer and the Baseline composite, however, the TPU and Epoxy bonded specimens showed no debonding. The low impact velocity range covered in these tests was 2.4 m/s to 3.96 m/s, which also corresponds to 5.4 miles/hr to 8.86 miles/hr.

The low impact test results demonstrate that the method and process described herein produce a multifunctional composite that has both high strength and rigidity and high impact and shatter resistance.

Although the invention is illustrated and described herein with reference to specific embodiments, the invention is not intended to be limited to the details shown. Rather, various modifications may be made in the details within the scope and range of equivalents of the claims and without departing from the invention.

TABLE 1

| MATERIAL ID | Impact Energy at Perforation, $E_I$, J | Peak Force at Perforation, $P_{max}$ kN | Energy Absorbed at Perforation, $E_A$, J | Percent Increase in Energy Absorption |
|---|---|---|---|---|
| Baseline | 60 | 10.27 | 60 | 0% |
| IMPACGARD U/K | 80/93 | 10.55 | 77.1 | 29% |
| IMPACGARD I/K | 93 | 10.28 | 83.5 | 39% |
| EPOXY BONDED | 60 | 11.37 | 56.5 | −6% |

What is claimed:

1. An impact resistant composite structure comprising:
    a first composite layer comprising a high tenacity fiber coated by a matrix resin, wherein the matrix resin has elongation at break of at least about 100% and tensile strength at break of less than about 50 Mpa, and an infrared absorber polymer layer coated or extruded onto the first composite layer.

2. The composite structure of claim 1 wherein the matrix resin comprises an impact-absorbing elastomeric filler.

3. The composite structure of claim 2 wherein the impact-absorbing elastomeric filler is selected from the group consisting of thermoplastic elastomers, rubber elastomers, silicone elastomers, fluoroelastomers, and fluorosilicone elastomers.

4. The composite structure of claim 1 wherein the infrared absorber polymer layer comprises an absorber that absorbs radiation between about 700 nm and 2,000 nm in wavelength.

5. The composite structure of claim 1 wherein the infrared absorber polymer is between the first composite layer and a second composite layer.

6. The composite structure of claim 1 wherein the infrared absorber polymer is between the first composite layer and a substrate material.

7. The composite structure of claim 6 wherein the substrate material is selected from the group consisting of metal, ceramic, composite, polymer, glass, fabric, and concrete.

8. The composite structure of claim 6 wherein the substrate material is a fiber-reinforced composite substrate.

9. The composite structure of claim 8 wherein the fiber-reinforced composite substrate has elongation-at-break between about 1% and about 5%.

10. The composite structure of claim 1 wherein the high tenacity fiber has tensile strength of greater than about 10 g/denier.

11. The composite structure of claim 1 wherein the high tenacity fiber is selected from the group consisting of carbon fibers, aramid fibers, and glass fibers.

12. The composite structure of claim 1 wherein the high tenacity fiber is in the form of a fabric.

13. The composite structure of claim 1 wherein the high tenacity fiber is a carbon fiber.

14. The composite structure of claim 1 wherein the matrix resin has elongation at break between about 100% and 1800%.

15. The composite structure of claim 14 wherein the matrix resin has elongation at break between about 150% and 800%.

16. The composite structure of claim 1, wherein the high tenacity fiber is a synthetic or natural non-glass fiber.

* * * * *